(12) United States Patent  
Chang et al.

(10) Patent No.: US 12,307,125 B2
(45) Date of Patent: May 20, 2025

(54) METHOD AND APPARATUS FOR LOADING TASK DATA, AND COMPUTER DEVICE

(71) Applicant: Glenfly Tech Co., Ltd., Shanghai (CN)

(72) Inventors: Zhulin Chang, Shanghai (CN); Huaisheng Zhang, Shanghai (CN); Xin Jin, Shanghai (CN)

(73) Assignee: GLENFLY TECH CO., LTD., Shanghai (CN)

( * ) Notice: Subject to any disclaimer, the term of this patent is extended or adjusted under 35 U.S.C. 154(b) by 0 days.

(21) Appl. No.: 18/226,687

(22) Filed: Jul. 26, 2023

(65) Prior Publication Data

US 2024/0289048 A1 Aug. 29, 2024

(30) Foreign Application Priority Data

Feb. 24, 2023 (CN) .......................... 202310165914.2

(51) Int. Cl.
*G06F 3/06* (2006.01)

(52) U.S. Cl.
CPC .......... *G06F 3/0656* (2013.01); *G06F 3/0604* (2013.01); *G06F 3/0673* (2013.01)

(58) Field of Classification Search
CPC ..... G06F 3/0656; G06F 3/0604; G06F 3/0673
See application file for complete search history.

(56) References Cited

U.S. PATENT DOCUMENTS

| | | | |
|---|---|---|---|
| 5,625,808 A | 4/1997 | Webb et al. | |
| 2006/0123195 A1* | 6/2006 | Mukherjee | G06F 12/0835 |
| | | | 711/E12.057 |
| 2015/0095674 A1* | 4/2015 | Sasanka | G06F 12/0223 |
| | | | 713/322 |
| 2016/0077896 A1* | 3/2016 | Bolz | G06F 9/54 |
| | | | 719/328 |
| 2017/0262174 A1* | 9/2017 | Newburn | G06F 9/4881 |

(Continued)

FOREIGN PATENT DOCUMENTS

| | | |
|---|---|---|
| CN | 108463803 A | 8/2018 |
| CN | 114787785 A | 7/2022 |
| EP | 1168315 A2 | 1/2002 |

OTHER PUBLICATIONS

CN Office Action for App. No. 02310165914.2, dated Jan. 24, 2024 (4 pages). [English Translation].

(Continued)

*Primary Examiner* — Eric T Loonan
(74) *Attorney, Agent, or Firm* — NIXON PEABODY LLP

(57) ABSTRACT

Disclosed are method and apparatus for loading task data, a computer device, a storage medium, and a computer program product. The method includes: analyzing various types of buffers involved in a task after the task is initiated, and determining whether each of the buffers satisfies a preset read-only buffer condition; determining a buffer satisfying the read-only buffer condition as a read-only buffer; mapping the read-only buffer into a matched read-only storage space based on space information of the read-only storage space and size information of the read-only buffer, and obtaining corresponding read-only mapping information; and loading task data in the read-only buffer into the matched read-only storage space based on the read-only mapping information. With the method, the loading efficiency of task data can be improved.

9 Claims, 4 Drawing Sheets

(56) References Cited

U.S. PATENT DOCUMENTS

2020/0125290 A1* 4/2020 Shah ............... G06F 3/0634
2022/0107779 A1 4/2022 Abhishek et al.

OTHER PUBLICATIONS

Xuejun et al. "Study on Data Locality and its Optimization Technologies in Multiprocessor Systems." vol. 4, 5: 44-52 (2002). [English Abstract], May 2002.

* cited by examiner

METHOD AND APPARATUS FOR LOADING TASK DATA, AND COMPUTER DEVICE

CROSS REFERENCES TO RELATED APPLICATION

The present application claims priority to Chinese patent application No. 202310165914.2, titled "Method and Apparatus for Loading Task Data, and Computer Device", and filed on Feb. 24, 2023, the content of which is hereby incorporated by reference in its entirety.

TECHNICAL FIELD

The present disclosure relates to the field of computer technology, and particularly to method and apparatus for loading task data, a computer device, a storage medium and a computer program product.

BACKGROUND

OpenCL is a framework for writing programs for a heterogeneous platform which may consist of a central processing unit (CPU), a graphics processing unit (GPU), or other types of processors. The OpenCL consists of a language (based on C99) for writing kernels (functions that run on an OpenCL device) and a set of application program interfaces (APIs) for defining and controlling the platform.

The common heterogeneous mode of CPU and GPU are taken as an example, in a general way, the CPU terminal initiates the OpenCL task of the GPU terminal, and the compiler may use more efficient fetching instructions to complete the data loading function of the read-only buffer from the perspective of the OpenCL. If a buffer is not modified by the constant or the read-only qualifier, there is no STORE action for this Buffer in the actual code kernel. If such a buffer is still mapped by the compiler into the ordinary memory buffer, it is equivalent to abandoning the data load solution of the more efficient fetching instructions, thereby affecting the performance of the program.

SUMMARY

In view of this, as for the technical problem described above, it is necessary to provide method and apparatus for loading task data, a computer device, a computer-readable storage medium, and a computer program product capable of improving the loading efficiency of the task data.

In the first aspect of the present disclosure, a method for loading task data is provided, including: analyzing various types of buffers involved in a task after the task is initiated, and determining whether each of the buffers satisfies a preset read-only buffer condition; determining a buffer satisfying the read-only buffer condition as a read-only buffer; mapping the read-only buffer into a matched read-only storage space based on space information of the read-only storage space and size information of the read-only buffer, and obtaining corresponding read-only mapping information; and loading task data in the read-only buffer into the matched read-only storage space based on the read-only mapping information.

In an embodiment, the method further includes: determining a buffer dissatisfying the read-only buffer condition as a read-write buffer or a write buffer; mapping the read-write buffer or write buffer into a common storage space to obtain corresponding common mapping information; and loading task data in the read-write buffer or write buffer into the common storage space based on the common mapping information.

In an embodiment, the analyzing the various types of buffers involved in the task after the task is initiated, and determining whether each of the buffers satisfies the preset read-only buffer condition includes: analyzing the various types of buffers involved in the task to determine whether each of the buffers carries read-only attribute information; determining a buffer to satisfy the preset read-only buffer condition when the buffer carries the read-only attribute information.

In an embodiment, the method further includes: scanning an intermediate language when the buffer does not carry the read-only attribute information, and determining whether the buffer involves a writeback action, the intermediate language being an intermediate expression language generated by a compiler according to the task information; and determining the buffers to satisfy the preset read-only buffer condition when there is no writeback action involved.

In an embodiment, the read-only storage space includes a first constant storage area, a second constant storage area, and a sampler storage area. The mapping the read-only buffer into the matched read-only storage space based on the space information of the read-only storage space and the size information of the read-only buffer, and obtaining the corresponding read-only mapping information includes: mapping the read-only buffer into the first constant storage area when a storage space of the first constant storage area is determined to be larger than a storage space of the read-only buffer based on the space information of the read-only storage space and the size information of the read-only buffer; and mapping the read-only buffer into the second constant storage area or the sampler storage area when the storage space of the first constant storage area is determined to be smaller than the storage space of the read-only buffer based on the space information of the read-only storage space and the size information of the read-only buffer.

In an embodiment, the mapping the read-only buffer into the second constant storage area or the sampler storage area includes: performing load tradeoff on the second constant storage area and the sampler storage area, to map the read-only buffer into the second constant storage area or the sampler storage area.

In the second aspect of the present disclosure, an apparatus for loading task data is provided, including: an analysis module configured to analyze various types of buffers involved in a task after the task is initiated, and determine whether each of the buffers satisfies a preset read-only buffer condition; a processing module configured to determine a buffer satisfying the read-only buffer condition as a read-only buffer; a mapping module configured to map the read-only buffer into a matched read-only storage space based on space information of the read-only storage space and size information of the read-only buffer, and obtain corresponding read-only mapping information; and a loading module configured to load task data in the read-only buffer into the matched read-only storage space based on the read-only mapping information.

In the third aspect of the present disclosure, a computer device is provided, including a processor and a memory for storing a computer program. The processor, when executing the computer program, implements the steps of the method for loading task data in the above embodiments.

In the fourth aspect of the present disclosure, a computer-readable storage medium is provided, on which a computer program is stored. When the computer program is executed by a processor, the steps of the method for loading task data in the above embodiments are implemented.

In the fifth aspect of the present disclosure, a computer program product is provided, including a computer program. When the computer program is executed by a processor, the steps of the method for loading task data in the above embodiments are implemented.

As for the method and apparatus for loading task data, the computer device, the storage medium, and the computer program product, after the task is initiated, various types of buffers involved in the task are analyzed to determine whether each of the buffers satisfies the preset read-only buffer condition, the buffer satisfying the read-only buffer condition is determined as the read-only buffer, the read-only buffer is mapped into the matched read-only storage space based on the space information of the read-only storage space and the size information of the read-only buffer, the corresponding read-only mapping information is obtained, and the task data in the read-only buffer is loaded into the matched read-only storage space based on the read-only mapping information. After the task is initiated, the read-only buffer is determined, so that the read-only storage space matching the read-only buffer is determined, and then the task data is loaded into the matched read-only storage space. Accordingly, the bottleneck of data access can be effectively reduced, and the data loading efficiency is improved, thereby improving the overall performance of the program.

DETAILED DESCRIPTION

In order to make the purpose, the technical solution and advantages of the present disclosure clearer, the present disclosure will be described in further detail with reference to the accompanying drawings and embodiments. It should be appreciated that the specific embodiments described herein are merely intended to explain the present disclosure, rather than limiting the present disclosure.

Figure 1:
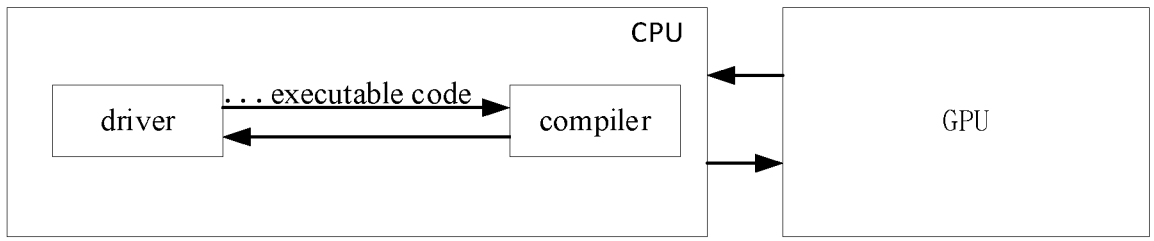
FIG. 1 is an application environment diagram of a method for loading task data according to an embodiment of the present disclosure.

A method for loading task data provided in an embodiment of the present disclosure may be applied to an application environment as shown in FIG. 1. The application environment shown in FIG. 1 includes a central processing unit (CPU) and a graphics processing unit (GPU). A driver and a compiler run on the CPU. The compiler may be OpenCL (which is a framework for writing programs for a heterogeneous platform) compiler. Specifically, the driver accepts and initiates a compilation task, and the compiler accepts the compilation task transmitted by the driver and works out an optimization decision according to the method for loading task data in the present disclosure, and feeds the optimization decision back to the driver. After receiving the optimization decision provided by the compiler, the driver efficiently loads the task data to be transmitted to the GPU.

In an embodiment, after the CPU initiates the task, the compiler in the CPU may analyze various types of buffers involved in the task, and determine whether each buffer satisfies a preset read-only buffer condition. The complier determines a buffer satisfying the read-only buffer condition as a read-only buffer, and maps the read-only buffer into a matched read-only storage space based on space information of the read-only storage space and size information of the read-only buffer, to obtain corresponding read-only mapping information. The driver in the CPU may load the task data in the read-only buffer into the matched read-only storage space based on the read-only mapping information.

Figure 2:
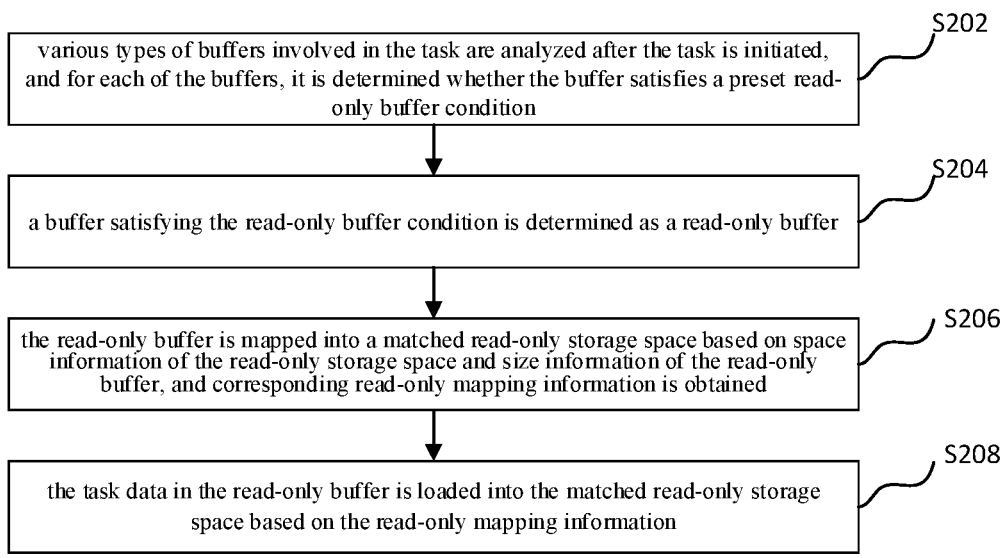
FIG. 2 is a flow chart showing a method for loading task data according to an embodiment of the present disclosure.

In an embodiment, as shown in FIG. 2, a method for loading task data is provided, which is applied to the CPU in FIG. 1 as an example for illustration. The CPU may be arranged in a computer device, and the method may include following steps.

Step S202: various types of buffers involved in the task are analyzed after the task is initiated, to determine whether each of the buffers satisfies a preset read-only buffer condition.

The task may be an OpenCL task initiated by the CPU terminal to the GPU terminal. the OpenCL task may carry various types of buffers for storing data. The read-only buffer condition may be a preset condition configured to determine whether a buffer is a read-only buffer. Specifically, the read-only buffer condition may be set based on attribute information of various types of buffers and execution actions of various types of buffers, and the like.

Step S204: a buffer satisfying the read-only buffer condition is determined as a read-only buffer.

The read-only buffer may be a buffer in which the memory operation involves only the read operation, without involving writeback actions such as STORE (write), ATOMIC (read and write), etc. If the compiler of the CPU determines that there exists a buffer satisfying the read-only buffer condition, the buffer is determined as the read-only buffer.

Step S206: the read-only buffer is mapped into a matched read-only storage space based on space information of the read-only storage space and size information of the read-only buffer, and corresponding read-only mapping information is obtained.

The read-only storage space may be a storage area in the GPU. The space information of the read-only storage space may be information characterizing a storage capacity of the read-only storage space. The size information of the read-only buffer may be information characterizing a size of the read-only buffer. The read-only mapping information may be information characterizing a mapping relationship between the read-only buffer and the read-only storage space. The compiler may determine the read-only storage space matching the read-only buffer based on the space information and the size information, and map the read-only buffer into the matched read-only storage space, to establish the mapping relationship between the read-only buffer and the read-only storage space, and obtain the read-only mapping information.

Step S208: the task data in the read-only buffer is loaded into the matched read-only storage space based on the read-only mapping information.

After determining the read-only mapping information, the compiler may transmit the read-only mapping information to the driver, and the driver may fetch the task data from the read-only buffer to the matched read-only storage space based on the read-only mapping information and an efficient fetching instruction which corresponds to the task initiated by the CPU and is determined by the compiler in the process of determining the read-only mapping information.

In the method for loading the task data, after the task is initiated, various types of buffers involved in the task are analyzed to determine whether each buffer satisfies the preset read-only buffer condition; the buffer satisfying the read-only buffer condition is determined as the read-only buffer, the read-only buffer is mapped into the matched read-only storage space based on the space information of the read-only storage space and the size information of the read-only buffer, the corresponding read-only mapping information is obtained, and the task data in the read-only buffer is loaded into the matched read-only storage space based on the read-only mapping information. After the task is initiated, the read-only buffer is determined, so that the read-only storage space matching the read-only buffer is determined, and then the task data is loaded into the matched read-only storage space. Accordingly, the bottleneck of data access can be effectively reduced, and the data loading efficiency is improved, thereby improving the overall performance of the program.

Since various types of buffers are involved in the task, it is still necessary to load the task in the buffer into the CPU for a non-read-only buffer. In an embodiment, the method may further include: a buffer dissatisfying the read-only buffer condition is determined as a read-write buffer or a write buffer; the read-write buffer or write buffer is mapped into a common storage space to obtain corresponding common mapping information; task data in the read-write buffer or write buffer is loaded into the common storage space based on the common mapping information.

The read-write buffer may be a buffer without carrying the attribute information of the read-only buffer, and the memory operation thereof involves the ATOMIC (read and write) operation. The read-write buffer may also be a buffer with the memory operation involving both the LOAD operation and the STORE operation. The write buffer may be a buffer without carrying the attribute information of the read-only buffer, and the memory operation thereof involves the STORE (write) operation.

The common storage space may be a storage space in the GPU set for the read-write buffer or the write buffer. The driver in the CPU needs to load the task data in the read-write buffer or the write buffer into the common storage area. The common mapping information may be information characterizing the mapping relationship between the read-write buffer and the common storage space, or between the write buffer and the common storage space. The compiler may map the read-write buffer or the write buffer into the common storage space, in order to establish the mapping relationship between the read-write buffer and the common storage space, or between the write buffer and the common storage space, and obtain the common mapping information. The driver may fetch the task data from the read-write buffer or the write buffer and store the task data into the matched common storage space based on the common mapping information and the fetching instruction which corresponds to the task and is determined by the compiler during determining the common mapping information.

In the above embodiment, the CPU loads the task data in the read-write buffer or the write buffer into the common storage space when the buffers in the condition of the read-write buffer or the write buffer. Accordingly, the CPU overall loads the task data in the read-write buffer or the write buffer into the common storage space on the basis of ensuring the loading efficiency of the task data in the read-only buffer.

In an embodiment, the step where various types of buffers involved in the task are analyzed and whether each buffer satisfies a preset read-only buffer condition is determined may include: various types of buffers involved in the task are analyzed to determine whether each of the buffers carries the read-only attribute information; when a buffer carries the read-only attribute information, the buffer is determined to satisfy the preset read-only buffer condition.

The read-only buffer condition may be "whether the read-only attribute information is carried, and if yes, the read-only buffer condition is satisfied". The read-only attribute information may be a read-only attribute that comes with the read-only buffer. Specifically, the read-only attribute information may be determined by a standard qualifier provided by OpenCL. Different types of buffers may correspond to corresponding standard qualifiers. For example, the standard qualifier corresponding to the read-only buffer may be "_read_only", "read_only", etc. If the compiler determines that there exists a buffer carrying a standard qualifier such as "_read_only", "read_only", etc., the buffer can be determined to be a read-only buffer.

In the embodiment described above, the compiler determines whether the buffer carries the standard qualifier coming with the read-only buffer. Since the standard qualifier is provided by the OpenCL, the compiler can accurately and quickly determine whether the buffer is a read-only buffer.

In an embodiment, the method further includes: an intermediate language is scanned when the buffers do not carry the read-only attribute information, and it is determined whether the buffers involve a writeback action, in which the intermediate language is an intermediate expression language generated by the compiler according to the task information; when there is no writeback action involved, it is determined that the buffers satisfy the preset read-only buffer condition.

Since there may exist some buffers that are not limited by the standard qualifiers, the compiler may analyze the intermediate language to determine whether a buffer in the intermediate language involves a writeback action (including a write operation (STORE), a read-write operation (ATMIC)). When there exists a buffer having only a fetching action without the writeback action, the buffer can also be determined as the read-only buffer, that is, the buffer still satisfies the read-only buffer condition.

In the embodiment described above, as for the situation where there exists a buffer which is not limited by a standard qualifier, the compiler further analyzes the intermediate language to determine whether there exists a writeback action in the intermediate language, so that various buffers can be more accurately categorized to determine the read-only buffer.

In an embodiment, the read-only storage space includes a first constant storage area, a second constant storage area, and a sampler storage area. The step of mapping the read-only buffer into the matched read-only storage space based on the space information of the read-only storage space and the size information of the read-only buffer may include: the read-only buffer is mapped into the first constant storage area when a storage space of the first constant storage area is determined to be larger than a storage space of the read-only buffer based on the space information of the read-only storage space and the size information of the read-only buffer; the read-only buffer is mapped into the second constant storage area or the sampler storage area when the storage space of the first constant storage area is determined to be smaller than the storage space of the read-only buffer based on the space information of the read-only storage space and the size information of the read-only buffer.

The first constant storage area may refer to a ConstBuffer storage area. The ConstBuffer storage area is a constant storage area which may be directly addressed, and may substitute a data load instruction of a common memory through a constant storage index mode (ConstBuffer Indexing). The second constant storage area may be a storage space corresponding to the ConstCache, and can substitute a data load instruction of the common memory through a CC_LOAD instruction. The sampler storage area may be a storage space corresponding to a sampler, and may substitute a data LOAD instruction of the common memory through a sampler instruction. Due to a large number of the data load instructions of the common memory, the number of instructions can be reduced through a substitution mode, and the operation efficiency can be improved in multiple dimensions.

The compiler may prioritize optimizing the read-only buffer into the first constant storage area. However, the capacity of the first constant storage area is limited, so that before mapping the read-only storage area, the compiler may compare the storage space of the first constant storage area to the storage space of the read-only buffer to determine the size relationship based on the space information of the read-only storage space and the size information of the read-only buffer. When it is determined according to the size relationship that the first constant storage area is capable of receiving the current read-only buffer, the compiler may preferentially map the read-only buffer to the first constant buffer. When the first constant storage area is incapable of receiving the current read-only buffer, the compiler may further select a storage area from the second constant storage area or the sampler storage area.

In an embodiment, the first constant storage area has a total of M bytes of storage space, including N bytes of storage space that need to be reserved, i.e., a total of (M-N) bytes of storage space available for compilation for read-only Buffer Load optimization. By analyzing, there exists a read-only buffer A and a read-only buffer B. When the first constant storage area has sufficient space to receive the read-only buffer A and the read-only buffer B, both the read-only buffer A and the read-only buffer B can be arranged in the first constant storage area. When in the following situation where A|B Buffer size <(M-N) bytes <A&&B Buffer size, only one of the read-only buffer A and the read-only buffer B can be mapped into the first constant storage area. Accordingly, the larger one of the read-only buffer A and the read-only buffer B can be preferably mapped into the first constant storage area, thereby mapping as much read-only buffer as possible into the first constant storage area.

In the embodiment described above, the compiler may firstly map the read-only buffer to the first constant storage area with the highest storage efficiency. But when the first constant storage area is insufficient to receive a certain read-only buffer, the compiler may consider the second constant storage area or sampler storage area, thereby avoiding overcapacity storage and errors on the basis of ensuring the read efficiency.

In an embodiment, the step of mapping the read-only buffer into the second constant storage area or the sampler storage area may include: load tradeoff is performed on the sampler storage area and the second constant storage area, to map the read-only buffer into the second constant storage area or the sampler storage area.

The compiler can trade off to determine whether the current read-only buffer is mapped to the second constant storage area or the sampler storage area. The compiler may perform a global tradeoff on all the unmapped read-only buffers, and give a priority to the second constant storage area when the sizes of all the unmapped read-only buffers are appropriate, and may give a priority to the sampler storage area when the sizes of all the unmapped read-only buffers are too large and a cache miss rate is taken into account. Furthermore, the compiler may also take into account the load tradeoff of the second constant storage area and the sampler storage area, and may also trade off part of the read-only buffers to the sampler storage area when all the read-only buffers to be mapped are capable of being mapped into the second constant storage area.

Specifically, when there exists three read-only buffers including a read-only buffer A, a read-only buffer B, and a read-only buffer C, in which the size of the read-only buffer C is smaller, the compiler may map the read-only buffer C into the second constant storage area. When the sizes of the read-only buffer A and the read-only buffer B are larger, and the second constant storage area is incapable of receiving the read-only buffer A and the read-only buffer B, one of the read-only buffer A and the read-only buffer B may be considered to be mapped into the second constant storage area and the other one may be mapped into the sampler storage area.

In the above embodiment, the compiler performs the tradeoff between the second constant storage area and the sampler storage area for all unmapped read-only buffers, and provides an optimization solution for load tradeoff in regard to finally selecting the second constant storage area or the sampler storage area to perform the load optimization.

Figure 3:
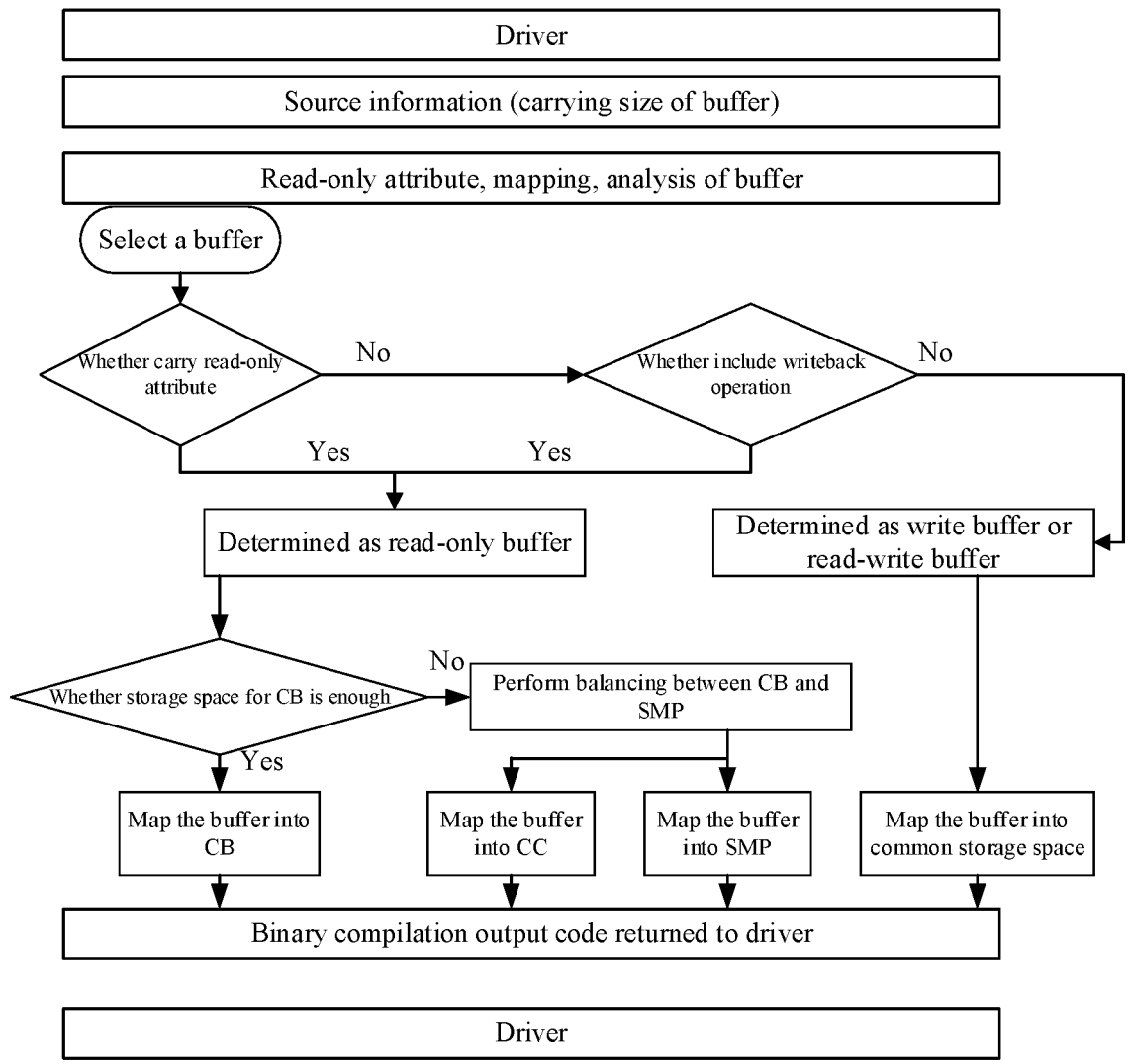
FIG. 3 is a flow chart showing a method for loading task data according to another embodiment of the present disclosure.

In an embodiment, as shown in FIG. 3, which is a flow chart showing a method for loading task data according to an embodiment.

The compiler may analyze any buffer involved in the task to determine whether the buffer is a read-only buffer. Specifically, if the OpenCL kernel (codes to be executed) parameter corresponding to the buffer carries the read-only attribute information, the buffer can be directly determined as a read-only buffer. Since there may exist some buffers which are not limited by standard qualifiers, the compiler may analyze the intermediate language to determine whether a buffer in the intermediate language involves a writeback action (including the write operation (STORE), ATOMIC (read and write) operation, and when a buffer has only a fetching action without the writeback action, the buffer may also be determined as the read-only buffer.

Since the CB (first constant storage area) is the most efficient, the compiler may prioritize optimizing the read-only buffer into the first constant storage area. But the capacity of the first constant storage aera is limited. Accordingly before mapping the read-only buffer, the compiler may compare the storage space of the first constant storage area to the storage space of the read-only buffer to determine a size relationship based on the space information of the read-only storage space and the size information of the read-only buffer. When the first constant storage area is determined to be capable of receiving the current read-only buffer according to the size relationship, the compiler can preferentially map the read-only buffer into the first constant storage area. When the first constant storage area is incapable of receiving the current read-only buffer, the compiler may further select a storage area from CC (the second constant storage area) or SMP (the sampler storage area).

Further, when selecting the storage area from CC (the second constant storage area) or SMP (sampler storage area), the compiler may perform a global tradeoff on all the unmapped read-only buffers, and give a priority to the second constant storage area when the sizes of all the unmapped read-only buffers are appropriate, and may give a priority to the sampler storage area when the sizes of all the unmapped read-only buffers are too large and a cache miss rate is taken into account. Furthermore, the compiler may also take into account the load tradeoff of the second constant storage area and the sampler storage area, and may also trade off part of the read-only buffers to the sampler storage area when all the read-only buffers to be mapped are capable of being mapped into the second constant storage area.

Figure 4:
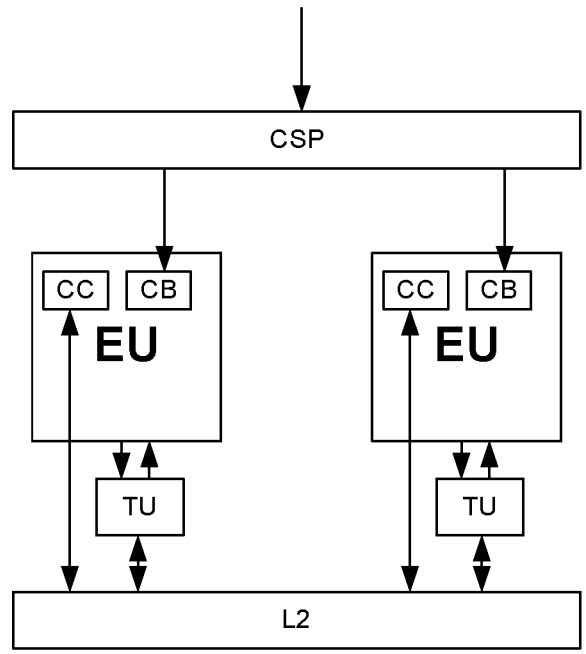
FIG. 4 is a block diagram illustrating a method for loading task data according to an embodiment of the present disclosure.

In an embodiment, shown in FIG. 4, which is a block structure diagram illustrating a method for loading task data according to an embodiment.

In FIG. 4, there are storage areas such as CC, CB, TU (SMP) and L2 (secondary cache). The storage area CB is a constant storage area, which can substitute the data load instruction of the common memory by means of the constant storage index mode (ConstBuffer-Indexing). The CC storage area can substitute the data load instruction of the common memory by means of the CC_LOAD instruction. The TU storage area can substitute the data load instruction of the common memory by means of the sampler instruction. Due to a large number of the data load instructions of the common memory, the number of instructions can be reduced through a substitution mode, and the operation efficiency can be improved in multiple dimensions.

It should be appreciated that although the steps in the flow charts of the embodiments described above are shown sequentially as indicated by the arrows, these steps are not definitely performed sequentially in the order indicated by the arrows. Unless specifically stated herein, the execution of these steps is not strictly limited in order, but may be performed in other orders. Further, at least part of the steps in the flow charts of the embodiments described above may include a plurality of steps or stages that may not definitely be performed at the same moment, but may be performed at different moments, and the steps or stages may not definitely be performed sequentially, but may be performed in turns or alternately with other steps or with at least part of the steps or stages of other steps.

Based on the same inventive concept, in an embodiment of the present disclosure, an apparatus for loading task data for implementing the above-mentioned method for loading task data is provided. The implementation solution for addressing the problem provided by the apparatus is similar to the implementation solution described in the above method, so that as for the specific limitations in one or more embodiments of the apparatus for loading task data provided below, reference can be made to the above limitations to the method for loading task data, which is not repeated herein.

Figure 5:
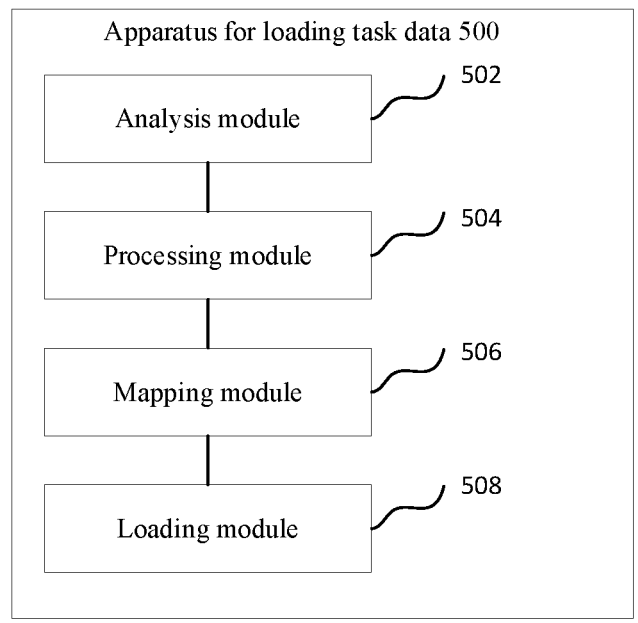
FIG. 5 is a block diagram illustrating an apparatus for loading task data according to an embodiment of the present disclosure.

In an embodiment, as shown in FIG. 5, an apparatus 500 for loading task data is provided, which includes: an analysis module, a processing module, a mapping module, and a loading module.

The analysis module 502 is configured to analyze various types of buffers involved in a task after the task is initiated, and determine whether each of the buffers satisfies a preset read-only buffer condition.

The processing module 504 is configured to determine a buffer satisfying the read-only buffer condition as a read-only buffer.

The mapping module 506 is configured to map the read-only buffer into a matched read-only storage space based on space information of the read-only storage space and size information of the read-only buffer, and obtain corresponding read-only mapping information.

The loading module 508 is configured to load task data in the read-only buffer into the matched read-only storage space based on the read-only mapping information.

In an embodiment, the apparatus further includes an other-buffer processing module.

The other-buffer processing module is configured to: determine a buffer dissatisfying the read-only buffer condition as a read-write buffer or a write buffer, map the read-write buffer or write buffer into a common storage space to obtain corresponding common mapping information, and load task data in the read-write buffer or write buffer into the common storage space based on the common mapping information.

In an embodiment, the analysis module is further configured to analyze the various types of buffers involved in the task to determine whether each of the buffers carries read-only attribute information, and determine that the buffer satisfies the preset read-only buffer condition when the buffer carries the read-only attribute information.

In an embodiment, the analysis module is further configured to scan an intermediate language when the buffer does not carry the read-only attribute information, and determine whether the buffer involves a writeback action, and determine that the buffer satisfies the preset read-only buffer condition when there is no writeback action involved. The intermediate language is an intermediate expression language generated by the compiler according to the task information.

In an embodiment, the mapping module is further configured to: map the read-only buffer into a first constant storage area when a storage space of the first constant storage area is determined to be larger than a storage space of the read-only buffer based on the space information of the read-only storage space and the size information of the read-only buffer, and map the read-only buffer into a second constant storage area or a sampler storage area when the storage space of the first constant storage area is determined to be smaller than the storage space of the read-only buffer based on the space information of the read-only storage space and the size information of the read-only buffer.

In an embodiment, the mapping module is further configured to perform load tradeoff on the sampler storage area and the second constant storage area, to map the read-only buffer into the second constant storage area or the sampler storage area.

The modules in the above-mentioned apparatus for loading task data may be implemented in whole or in part by software, hardware, and combinations thereof. The above modules may be embedded in or independent of a processor in a computer device in hardware form or may be stored in a memory of a computer device in software form, to facilitate a processor to invoke and perform operations corresponding to the modules.

Figure 6:
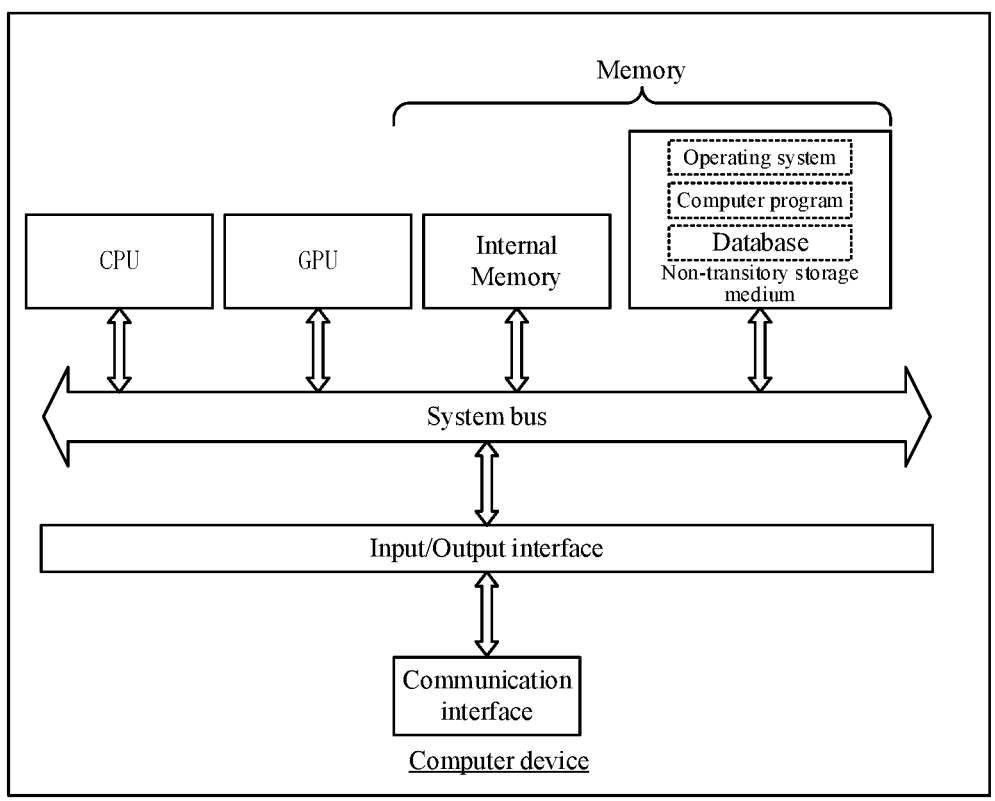
FIG. 6 is an internal structure diagram of a computer device according to an embodiment of the present disclosure.

In an embodiment, a computer device is provided, which may be a server or a terminal, and the server or terminal may include the CPU and the GPU related to in the present disclosure to complete the loading of the task data. The internal structure may be as shown in FIG. 6. The computer device may include a CPU, a GPU, a memory, an Input/Output (I/O) interface, and a communication interface. The processor, the memory and the input/output interface are connected to each other through a system bus, and the communication interface is connected to the system bus through the input/output interface. The processor of the computer device is configured to provide computing and control capabilities. The memory of the computer device may include a non-transitory storage medium and an internal memory. The non-transitory storage medium may store an operating system, a computer program, and a database. The memory provides an operating environment for the operating system and computer program in the non-transitory storage medium. The database of the computer device is configured to store task data. The input/output interface of the computer device is configured to exchange information between the processor and an external device. The communication interface of the computer device is configured to communicate with an external terminal through a network connection. The computer program is executed by the processor to implement a method for loading task data.

Those skilled in the art may appreciate that the structure shown in FIG. 6 is merely a block diagram of a portion of the structure associated with the solution of the present disclosure, and does not constitute a limitation to the computer device to which the solution of the present disclosure is applied. A specific computer device may include more or less components than that shown in the drawings, or may combine certain components, or may have different component arrangements.

In an embodiment, a computer device is provided, which includes a processor and a memory for storing a computer program. The processor, when executing the computer program, implements the steps in the above-mentioned method for loading task data.

In an embodiment, a computer-readable storage medium is provided, on which a computer program is stored. When the computer program is executed by a processor, the steps in the above-mentioned method for loading task data are implemented.

In an embodiment, a computer program product is provided, which includes a computer program. When the computer program is executed by a processor, the steps in the above-mentioned method for loading task data are implemented.

It should be noted that the user information (including but not limited to user device information, user personal information, etc.) and data (including but not limited to data for analysis, stored data, displayed data, etc.) involved in the present disclosure are all information and data authorized by the user or fully authorized by all parties, and the collection, use and processing of relevant data need to comply with relevant laws, regulations and standards of relevant countries and regions.

Those of ordinary skill in the art can understand that all or part of the procedures in the method of the above embodiments can be implemented by instructing relevant hardware through a computer program, and the computer program can be stored in a non-transitory computer-readable storage medium, when the computer program is executed, the procedures in the above-mentioned method embodiments can be performed. Any reference to a memory, a database or other media used in the various embodiments provided in the present disclosure may include at least one of a non-transitory memory and a transitory memory. The non-transitory memory may include a read-only memory (ROM), a magnetic tape, a floppy disk, a flash memory, an optical memory, a high-density embedded non-transitory memory, a resistive memory (ReRAM), a magnetoresistive random access memory (MRAM), a ferroelectric random access memory (FRAM), a phase change memory (PCM), a graphene memory, etc. The transitory memory may include a random access memory (RAM) or an external cache memory, and the like. As an illustration and not a limitation, the RAM may be in various forms, such as a static random access memory (SRAM) or a dynamic random access memory (DRAM). The database involved in the various embodiments provided in the present disclosure may include at least one of a relational database and a non-relational database. The non-relational database may include a tile-chain-based distributed database, etc., but is not limited thereto. The processor involved in the various embodiments provided in the present disclosure may be a general-purpose processor, a central processing unit, a graphics processor, a digital signal processor, a programmable logic device, a data processing logic device based on quantum computation, etc., but is not limited thereto.

The technical limitations in the above embodiments can be combined arbitrarily. In order to make the description concise, all possible combinations of the technical limitations in the above embodiments are not described. However, as long as there is no contradiction in the combination of these technical limitations, theses combinations considered to fall within the scope of the present disclosure.

The above-mentioned embodiments merely some exemplary embodiments of the present disclosure, and the descriptions thereof are relatively specific and detailed, but should not be construed as a limitation on the scope of the present disclosure. It should be pointed out that those skilled in the art can make several modifications and improvements without departing from the concept of the present disclosure, which all belong to the protection scope of the present disclosure. Therefore, the scope of protection of the present disclosure is subject to the appended claims.

What is claimed is:

1. A method for loading task data, comprising the steps of:
analyzing various types of buffers involved in a task after the task is initiated, and determining whether each of the buffers satisfies a preset read-only buffer condition;
determining a buffer satisfying the read-only buffer condition as a read-only buffer;
mapping the read-only buffer into a matched read-only storage space based on space information of the matched read-only storage space and size information of the read-only buffer, and obtaining corresponding read-only mapping information; and
loading task data in the read-only buffer into the matched read-only storage space based on the read-only mapping information;
wherein the matched read-only storage space comprises a first constant storage area, a second constant storage area, and a sampler storage area;
wherein the mapping the read-only buffer into the matched read-only storage space based on the space information of the matched read-only storage space and the size information of the read-only buffer, and obtaining the corresponding read-only mapping information comprises:
mapping the read-only buffer into the first constant storage area when a storage space of the first constant storage area is determined to be larger than a storage space of the read-only buffer based on the space information of the matched read-only storage space and the size information of the read-only buffer; and mapping the read-only buffer into the second constant storage area or the sampler storage area when the storage space of the first constant storage area is determined to be smaller than the storage space of the read-only buffer based on the space information of the matched read-only storage space and the size information of the read-only buffer.

2. The method according to claim 1, further comprising:
determining a buffer dissatisfying the preset read-only buffer condition as a read-write buffer or a write buffer;
mapping the read-write buffer or the write buffer into a common storage space to obtain corresponding common mapping information; and
loading the task data in the read-write buffer or the write buffer into the common storage space based on the common mapping information.

3. The method according to claim 1, wherein the analyzing the various types of buffers involved in the task after the task is initiated, and determining whether each of the buffers satisfies the preset read-only buffer condition comprises:
analyzing the various types of buffers involved in the task to determine whether each of the buffers carries read-only attribute information;
determining a buffer to satisfy the preset read-only buffer condition when the buffer carries the read-only attribute information.

4. The method according to claim 3, further comprising:
scanning an intermediate language when the buffers do not carry the read-only attribute information, and determining whether each of the various types of buffers involve a writeback action, wherein the intermediate language is an intermediate expression language generated by a compiler according to task information;
determining the various types of buffers to satisfy the preset read-only buffer condition when there is no writeback action involved.

5. The method according to claim 1, wherein the mapping the read-only buffer into the second constant storage area or the sampler storage area comprises:
performing load tradeoff on the second constant storage area and the sampler storage area, to map the read-only buffer into the second constant storage area or the sampler storage area.

6. An apparatus for loading task data, comprising: a processor, including a memory for storing instructions executed by the processor, and various types of buffers involved in a task, and read-only storage space:
wherein the read-only storage space comprises a first constant storage area, a second constant storage area, and a sampler storage area;
wherein the processor is configured to:
analyze the various types of buffers involved in loading the task data after the task is initiated, and determine whether each of the various types of buffers satisfies a preset read-only buffer condition;
designating each buffer satisfying the preset read-only buffer condition as a read-only buffer;
map the read-only buffer into the read-only storage space based on space information of a read-only storage space and the size information of the read-only buffer, and obtaining corresponding read-only mapping information, wherein the mapping is performed as follows:
map the read-only buffer into the first constant storage area when a storage space of the first constant storage area is determined to be larger than a storage space of the read-only buffer based on space information of a read-only storage space and size information of the read-only buffer; and
map the read-only buffer into the second constant storage area or the sampler storage area when the storage space of the first constant storage area is determined to be smaller than the storage space of the read-only buffer based on the space information of the read-only storage space and the size information of the read-only buffer, wherein the read-only storage space comprises the first constant storage area, the second constant storage area, and the sampler storage area; and
load task data in the read-only buffer into the read-only storage space based on the read-only mapping information.

7. A computer device, comprising a processor and a memory for storing a computer program, wherein the processor, when executing the computer program, implements the steps in the method of claim 1.

8. A non-transitory computer-readable storage medium, on which a computer program is stored, wherein the computer program, when executed by a processor, causes the processor to implement the steps in the method of claim 1.

9. A computer program product, comprising a processor and a computer program, wherein the computer program, when executed by the processor, causes the processor to implement the steps in the method of claim 1.

* * * * *